Sept. 11, 1956  J. TAYLOR ET AL  2,762,272
APPARATUS FOR MAKING VALVE BAGS
Filed April 13, 1953  5 Sheets-Sheet 1
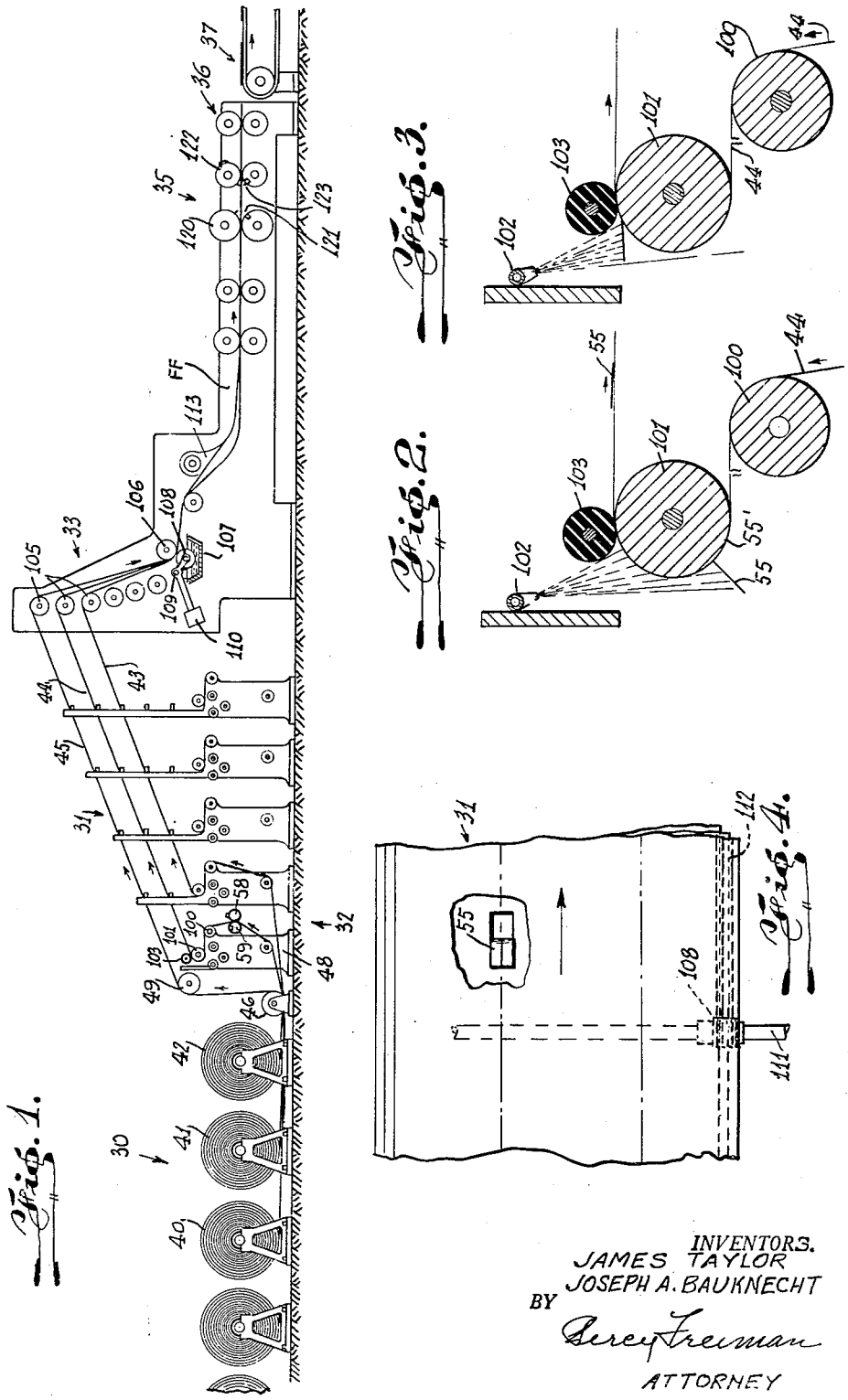
INVENTORS.
JAMES TAYLOR
JOSEPH A. BAUKNECHT
BY
ATTORNEY

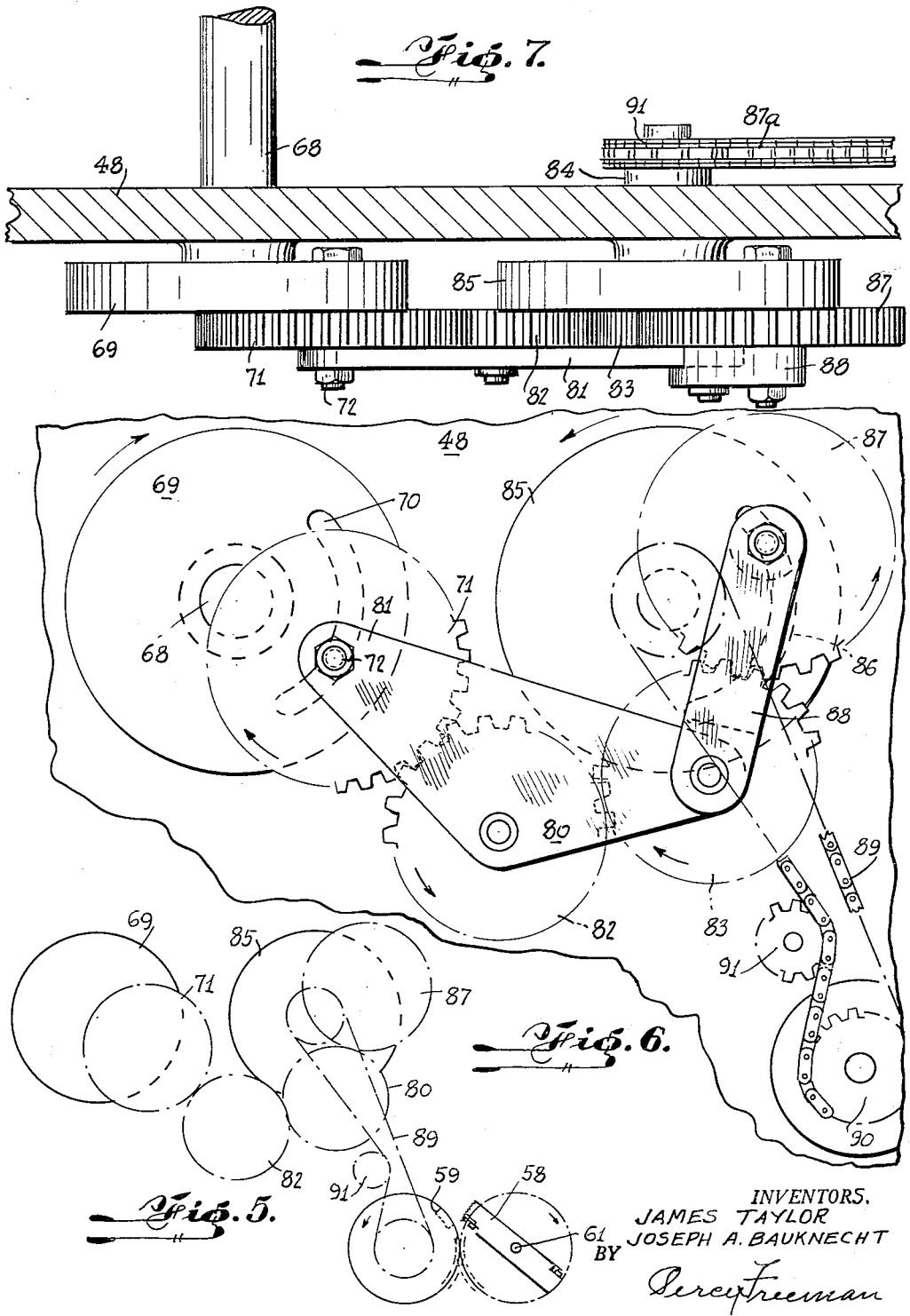

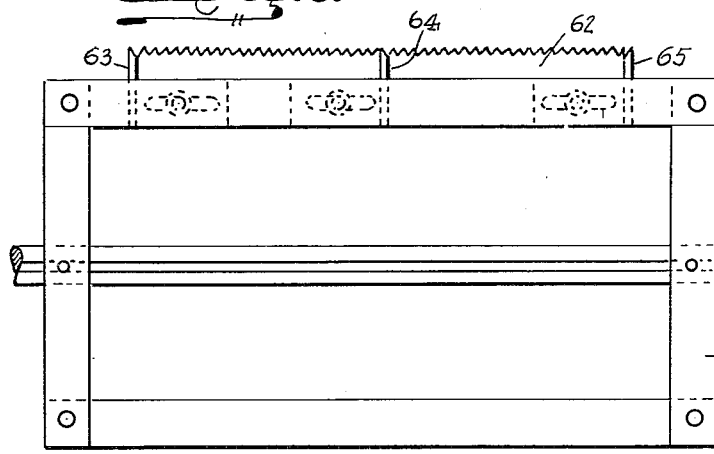
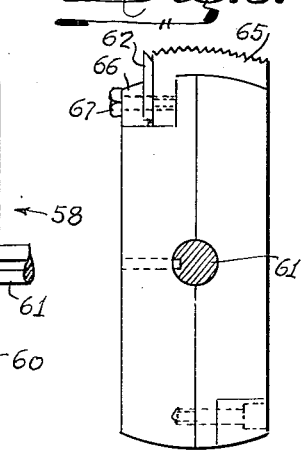
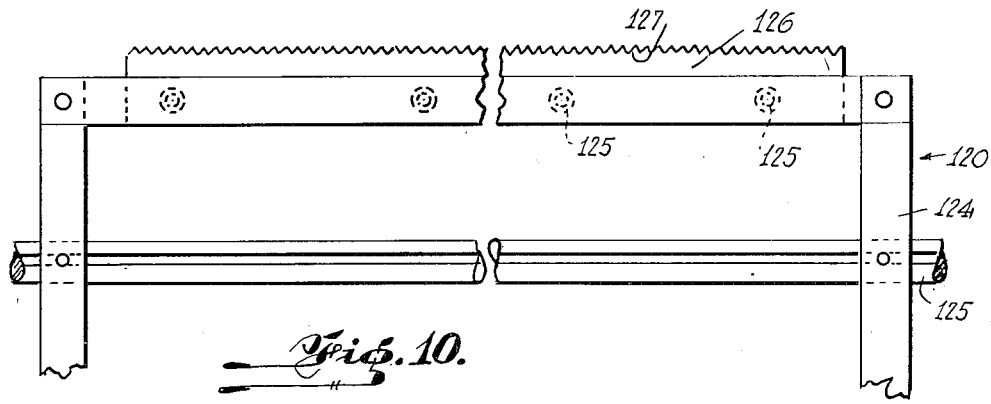
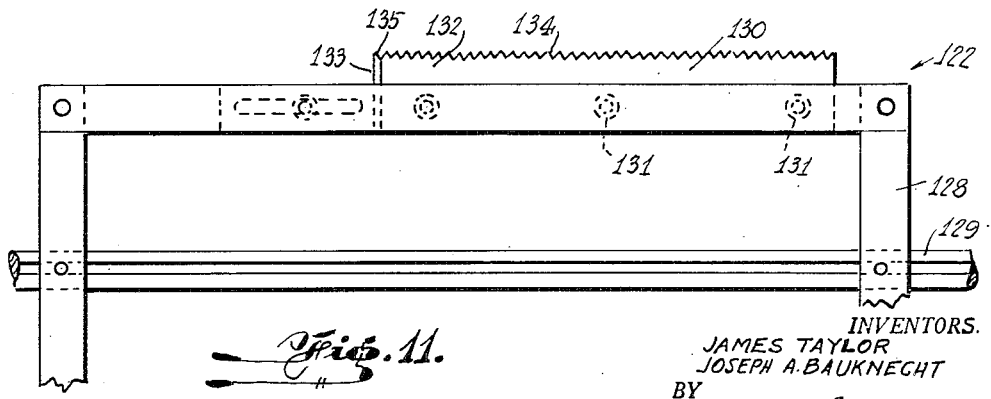

INVENTORS.
JAMES TAYLOR
JOSEPH A. BAUKNECHT
BY
ATTORNEY

Sept. 11, 1956  J. TAYLOR ET AL  2,762,272
APPARATUS FOR MAKING VALVE BAGS
Filed April 13, 1953  5 Sheets-Sheet 5
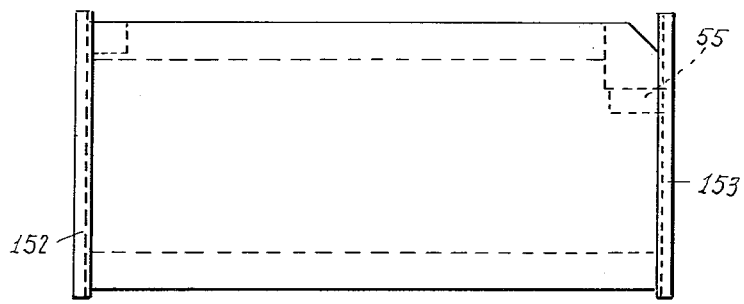
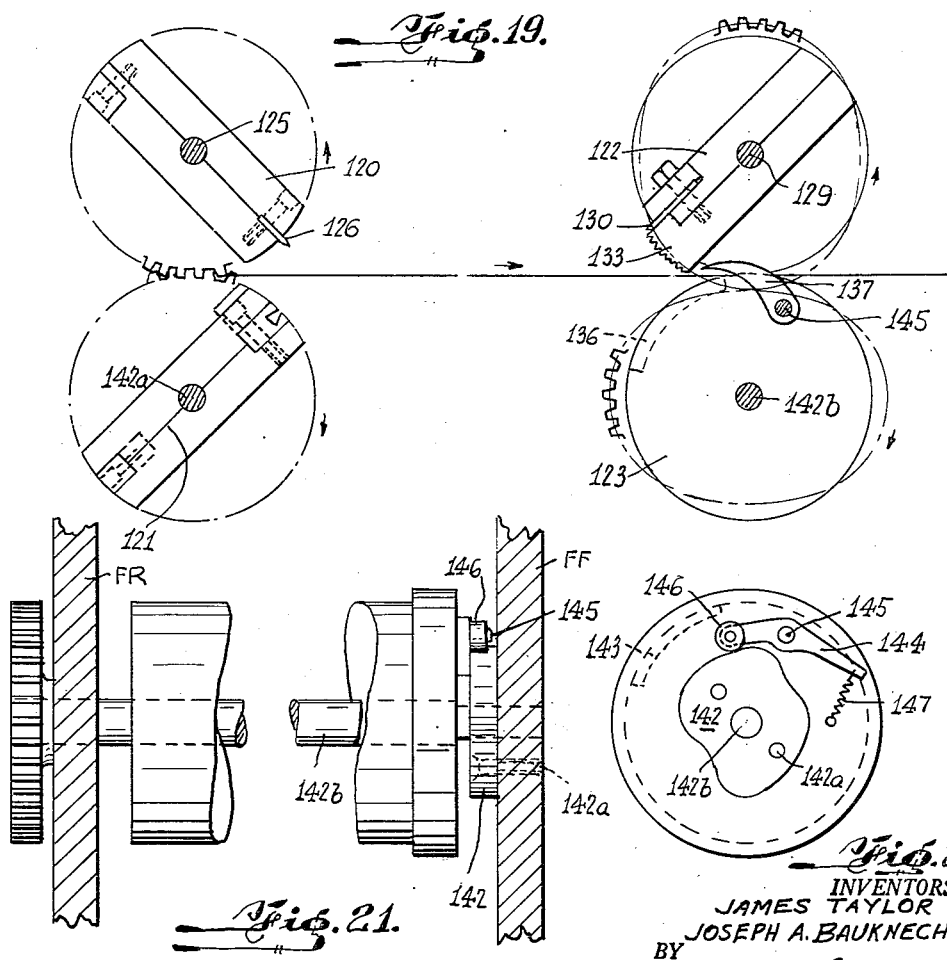
INVENTORS.
JAMES TAYLOR
JOSEPH A. BAUKNECHT
BY Percy Freeman
ATTORNEY.

United States Patent Office 2,762,272
Patented Sept. 11, 1956

2,762,272

APPARATUS FOR MAKING VALVE BAGS

James Taylor, Westbury, N. Y., and Joseph A. Bauknecht, St. Marys, Ga., assignors to Kraft Bag Corporation, Gilman, Vt., a corporation of New York Application April 13, 1953, Serial No. 348,152

4 Claims. (Cl. 93—19)

The present invention relates generally to bag manufacturing apparatus. It is particularly directed to improvements in apparatus for making paper bags of the valve type, such as that disclosed in U. S. Patent No. Re. 23,230, granted May 16, 1950, to H. E. Lee.

As is well known to those versed in the art, it was heretofore necessary, in the manufacture of valved paper bags, to manually insert and secure the valve extension flap by pasting or other suitable means. Obviously, this operation was time-consuming and costly, in addition to reducing the desired flexibility of the valve extension.

Accordingly, it is a principal object of the present invention to provide a single machine which simply and efficiently produces a valve bag tube having a valve extension on one end and an integrally formed valve extension flap.

It is another object of the present invention to provide valve bag manufacturing apparatus, wherein a valve extension flap is formed in one of a plurality of webs and folded thereagainst to permit severance of the webs, after tubing, without damage to the flap. Thus, the flap may be later unfolded to provide an integral, flexible valve extension which is adapted to seal the bag as disclosed in the above-mentioned patent.

It is still another object of the present invention to provide the novel combination with a bag tube former, commonly called a tuber, of flap cutting and folding means disposed ahead of the tuber, to thereby produce a tube having preformed valve extension flaps.

It is yet another object of the present invention to provide a novel flap forming and folding means which is simple in construction, efficient in operation, and which is well adapted for use with conventional tube forming devices.

It is yet another object of the present invention to provide novel tube cut-off means which is adapted to sever the tube in bag lengths, each having a valve extension on one end, and which is constructed to quickly and positively remove waste so as to insure continuous, trouble-free operation.

It is a further object of the present invention to provide bag-making apparatus of the type described which is simple and durable, effective for its intended objects, and which can be manufactured and operated at a reasonable cost.

Other and more specific objects, features and advantages of the present invention will more clearly appear from the detailed description given below, taken in connection with the accompanying drawings, which form a material part of this specification, and illustrate, by way of example, one embodiment of the invention. The invention consists in such novel features, arrangements and combinations of elements as may be shown and described in connection with the constructions herein disclosed.

In the drawings:

Fig. 1 is a side elevational view of a bag-making machine embodying the present invention.

Fig. 2 is a sectional, side elevational view, greatly enlarged, showing the flap-folding means of the present invention, with the web in one position of its movement.

Fig. 3 is a view similar to Fig. 2, with the web in another position of its movement.

Fig. 4 is a fragmentary top plan view showing the webs traveling over the paste roll.

Fig. 5 is a schematic representation showing the flap-cutting means of the present invention and the driving means therefor.

Fig. 6 is a fragmentary side elevational view showing the drive means for the flap-cutting means of the present invention.

Fig. 7 is a top plan view showink the flap cutter driving means of Fig. 6.

Fig. 8 is a side elevational view showing the flap cutter of the present invention.

Fig. 9 is an end elevational view of the device shown in Fig. 8.

Fig. 10 is a side elevational view showing the tube severing cutter of the present invention.

Fig. 11 is a side elevational view showing the bag end step cutter of the present invention.

Fig. 18 is a top plan view of a completed bag formed by the apparatus of the present invention.

Fig. 19 is a side elevational view showing the bag tube cut-off means of the present invention.

Fig. 20 is a side elevational view showing the cam actuating means used in conjunction with the tube cut-off means of the present invention.

Fig. 21 is a plan view showing the cam actuating means used in conjunction with the tube cut-off means.

Figure 12:
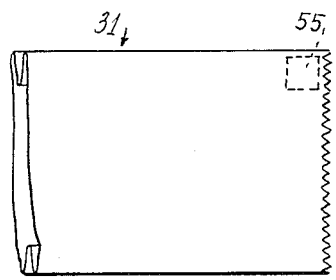
Fig. 12 is a fragmentary, top plan view of a bag tube, having just passed the severing cutter.

Referring now more particularly to the drawings, and specifically to Fig. 1 thereof, the embodiment of the invention illustrated therein comprises generally a plurality of web feeding rolls designated 30, which feed a plurality of webs 31 through the web strands 32 and into a web tuber 33, wherein the webs are formed into a multi-ply tube and withdrawn through the draw rollers 34. While passing through the web stands 32, an intermediate one of the webs 31 is formed with a folded valve extension flap as will be described more fully hereinafter. The draw rollers 34 feed the tubed web to a cut-off means 35, which severs the tube in bag lengths and forms a valve extension on one end, the bag lengths then being delivered by rolls 36 to a conveyor 37 for further operations, as desired.

There are illustrated three feeding rolls 40, 41, and 42, delivering from their undersides webs 43, 44 and 45, respectively, which webs pass together below roll 46. Lowermost web 43 and intermediate web 44 pass upwardly through web stands 47 and 48, respectively, and uppermost web 45 passes upwardly and over roll 49, the three webs then advancing through the remaining guide stands generally upwardly and to the right, as indicated by the arrows in Fig. 1.

Intermediate web 44, while passing through web strand 48, is formed with a longitudinally extending valve extension flap 55 having its free end 56 extending in the direction of movement of the webs, indicated by the arrows, the flap being formed with an intermediate slit or cut 57. The mechanism which effects the cutting of flap 55 comprises a rotary cutter 58 and a rotary cutter bar 59 geared to the cutter and cooperating therewith to effect a cleanly cut flap 55. The cutter 58, best seen in Fig. 8, includes a frame 60 keyed to a rotary shaft 61 and mounting a first serrated knife 62 extending transversely of the web 44 and a plurality of serrated knives 63, 64 and 65 arranged in parallel spaced relation with respect to each other and normal to the knife 62. The knives 62, 63, 64 and 65 may be adjustably positioned and secured to the frame 60 by the bar 66 and bolts 67.

In order to insure uniformly clean and accurate cutting of the moving paper web, it is desirable that the velocity of the cutting edge exceed that of the web. Preferably, the cutting edge should employ a whipping action to simultaneously effect momentary shearing and tearing of the web. The cutter 58 is driven by means (see Figs. 5, 6 and 7) having spaced, short periods of relatively high acceleration to thereby effect the desired whipping action. Journaled in the web stand 48 is a shaft 68 having fixedly secured on one end a crank or disc 69, which is formed with an arcuate slot 70. Any suitable, constant speed drive means (not shown) is connected to shaft 68, and a spur gear 71 is fixedly secured to the disc 69, the spur gear being adjustably positioned at any selected point along slot 70 and fixedly secured by any suitable securing means 72. A triangular link 80 has one end 81 pivoted centrally of spur gear 71, and is provided with rotary meshing spur gears 82 and 83, spur gear 82 further meshing with spur gear 71. Also journaled on web stand 48 is a stub shaft 84 having fixedly secured on one end a crank or disc 85, which is formed an arcuate slot 86. Fixedly secured on the crank 85 at any selected position along the slot 86 is a spur gear 87, which is retained in meshing engagement with spur gear 83 by a link 88 having its opposite ends pivoted centrally of the spur gears 83 and 87. Thus, it is seen that constant speed rotation of the shaft 68 will effect rotative movement of the shaft 84 having regularly spaced intervals of relatively high acceleration. This varying speed is transmitted by a chain 89 to the cutter bar drive means 90, the chain being tensioned by idler 91. The cutter bar 59 is geared to the cutter 58 to simultaneously cooperate in effecting a whipping cutting action with respect to the web 44.

Figure 14:
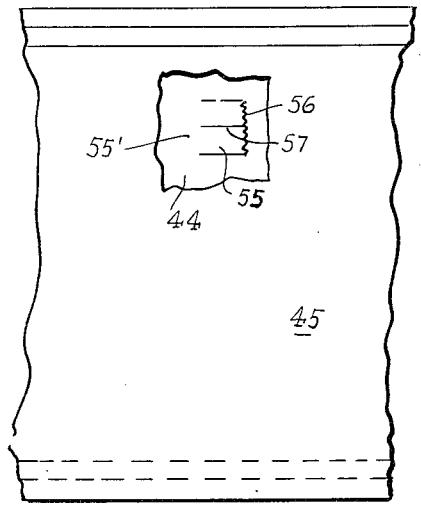
Fig. 14 is a fragmentary top plan view of a plurality of webs before passing through the flap-folding means.
Figure 15:
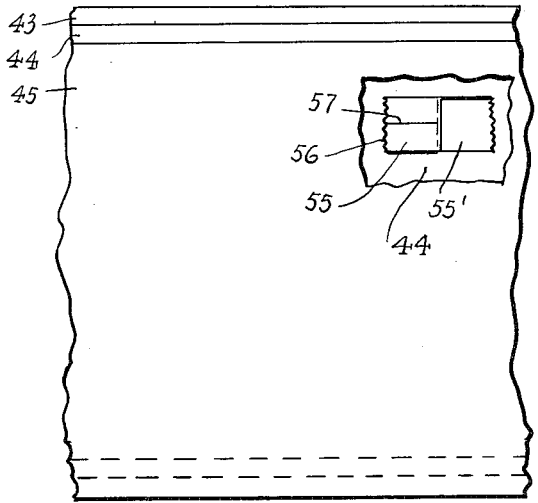
Fig. 15 is a fragmentary, top plan view of a plurality of webs after passing through the flap-folding means.

As noted hereinbefore, the valve extension flap 55 is cut with its free end 56 extending in the direction of movement of the webs, and folded against the associated web with its free end extending oppositely to the direction of movement of the webs. This folding operation is accomplished by a mechanism mounted on web stand 48, and best seen in Figs. 2 and 3. The web 44 passes upwardly from the flap cutter and cutter bar 58 and 59 and rearwardly over roll 100, whence it passes forwardly over roll 101. Thus, the web 44 is bent around 180° of the roll 101, which causes the flap 55 to project tangentially with respect to the roll 101. Disposed above and rearwardly of roll 101 is a nozzle 102 or other suitable means for ejecting fluid. The nozzle 102 is directed downwardly against the roll 101 oppositely with respect to the direction of movement of the web 44, and is connected to a supply of air or other suitable fluid to provide a fluid stream or blast. The fluid or air blast impinges upon the tangentially extending flap 55 and turns the same rearwardly toward the adjacent connecting portion 55' of the web 44. The air blast is of sufficient width to hold the flap 55 in its rearwardly turned condition until the flap reaches a position adjacent the top of roll 101. In this region is located a creasing roll 103 preferably fabricated of rubber or other resilient material, and cooperating with roll 101 to crease the flap 55 and fold the latter against the adjacent portion of web 44. Thus, Fig. 14 illustrates the condition of web 44 with the flap 55 formed in the web but unfolded, the web having just been operated upon by the cutting means 58 and 59. In Fig. 15 is illustrated the condition of web 44 with the flap 55 folded rearwardly, after passing through the folding means 101, 102 and 103.

The webs 43, 44 and 45 advance through the guide stands 32 and enter the tuber 33 in parallel spaced laterally offset relation with respect to each other, as seen in Fig. 15. That is, opposite side edge portions of each web, one facing upwardly and one downwardly, are exposed beyond the next adjacent web, for a purpose appearing hereinafter. The webs 31 advance downwardly over the rolls 105 and converge to pass forwardly under roll 106. Disposed below and adjacent to the roll 106 is a paste pot or container 107 for holding a quantity of paste or other suitable adhesive. A paste roll 108 is mounted for swinging movement, as at 109, and has its lower portion disposed within the paste pot 107, its upper portion abutting the underside of the webs 31. A counterweight 110 is operatively connected to the paste roll 108 to maintain the latter in abutting engagement with the underside of multiple-ply web 31, so that paste will be transferred by rotation of rolls 108 from the paste pot 107 to the exposed underside side edge portions of the webs. This is shown in greater detail in Fig. 4, wherein the paste roll 108 is journaled on a shaft 111 and rolls with the multiple-ply web 31 to apply adhesive to the underside thereof as in the region designated 112 ahead of the paste roll.

After paste has been applied, as described above, the multiple-ply web 31 is tubed by the former 113, so that the opposite edge portions of each web are severally secured to each other. If desired, there may be provided means (not shown) for gusseting the tube or tubed webs. While the invention is equally applicable to bags with or without gussets, gusseted bags are illustrated in Figs. 12, 13, 16, 17 and 18, and particular reference will be made thereto.

Figure 13:
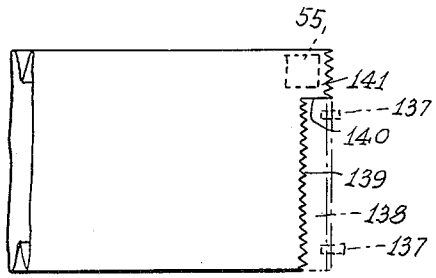
Fig. 13 is a fragmentary top plan view showing a bag tube, having just passed the end step cutter.

The draw rollers 34 serve to pull the webs through the tuber 33 and to advance the tube to the cut-off means 35. The cut-off means 35 includes a first rotary cutter 120 having a cooperating rotary cutter bar 121, and a second rotary cutter 122 having a cooperating cutter bar and waste removal means 123. The first rotary cutter 120 is best seen in Fig. 10 and comprises a frame 124 keyed to a rotary shaft 125 for rotation therewith. Adjustably secured to the frame 124 by bolts 125a is a transversely extending knife 126 having a serrated cutting edge 127 and of a length sufficient to cut across the entire width of the bag tube to completely sever the latter. The rotative movement of cutter 120 and cutter bar 121 is timed with respect to the flap cutter 58 so as to sever the tube 31 along a transverse line near to but spaced from the flap 55 adjacent the fold line thereof. Thus, the flap cutter 58 and the severing cutter 120 are synchronized with each other and with the movement of the tube 31 so as to form bag tubes of a predetermined length and having a flap 55 adjacent to one end of the bag tube. As illustrated in Figs. 12 and 13, the flap 55 is disposed in the tube gusset and adjacent portion, for a purpose appearing hereinafter.

The second cutter 122 is arranged closely behind the first cutter 120 and comprises a frame 128 keyed to a rotary shaft 129 for rotation therewith, and a transversely extending knife 130 adjustably mounted on the frame 128 by bolts 131, and extending only partially across the width of the bag tube 31. Disposed adjacent the inner end 132 of knife 130 is a knife 133 arranged perpendicular to the knife 130 and adjustably mounted in the frame 128. The knives 130 and 133 have their cutting edges serrated as at 134 and 135. Arranged to cooperate with the cutter 122 is a rotary cutter bar 136 having gripping fingers 137 for a purpose appearing hereinafter.

In operation, as the severed tube end is advanced to the second cutter 122, the gripping fingers 137 hold the tube end portion against the cutter bar 136, and the knives 130 and 133 combine to make a step cut, as at 138. That is, the knife 130 severs the tube transversely along part of its width as at 139, and the knife 133 severs the tube longitudinally adjacent to and spaced from the flap 55 as at 140, to thereby provide a valve extension 141. The tube portion which is cut out to form the stepped end is held by the gripping fingers 137 and released thereby at the lowermost position of the fingers, thereby removing the waste from the operating region. This is accomplished by means of fixed cam 142, see Fig. 20. A disc 143 is rotatable with the cutter bar 136, and a cam follower 144 is pivoted intermediate its ends at 145 to the disc 143, there being a roller 146 on one end of the cam follower 144 for rolling engagement with the cam 142 and spring means 147 yieldably holding the roller 146 in engagement with the cam 142. The fingers 137 are operatively connected to cam follower 144, whereby the contour of the cam 142 effects the gripping and releasing actions of the fingers 137 at the proper moments.

It is understood that only the forward or leading end of the bag length tubes are step cut, as described above, the rearward or trailing ends being severed straight across. As it is highly desirable that the waste notch produced by the step cutter 122 be quickly removed from the operating region, it is preferred to use a quick return mechanism for swinging the gripping fingers 137 downwardly away from the cutter 122. This may be accomplished by the use of elliptical gears on the cutter and cutter bar shaft so that the cutter bar shaft is driven from the cutter shaft. In this manner the excess notch or waste material is quickly gripped and carried away from the operating region for discharge at the lowermost point of the gripping fingers movement, preferably to a continuously operating conveyor.

The bag length tubes are then advanced by the delivery rolls 36 to a conveyor 37 for further operations.

Figure 16:
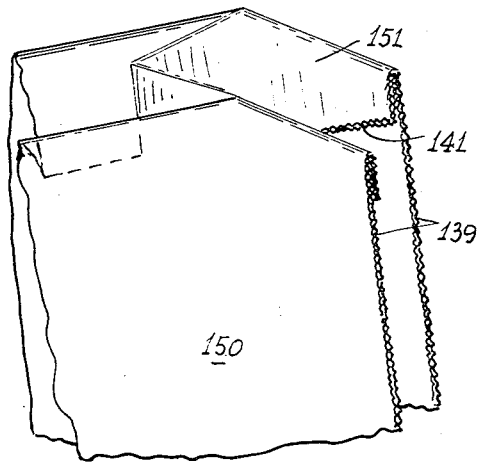
Fig. 16 is a fragmentary, perspective view showing the valved corner of a bag before the valve extension flap has been unfolded.
Figure 17:
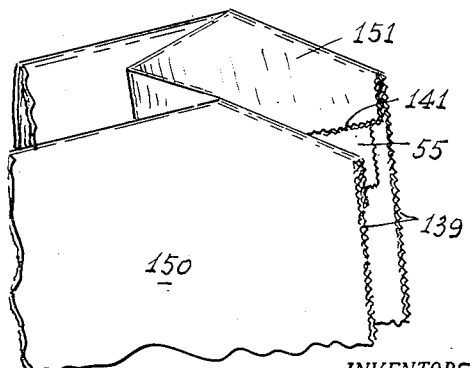
Fig. 17 is a fragmentary, perspective view of a valve bag showing the valved corner thereof after the valve extension flap has been unfolded.

In order to complete a bag, it is merely necessary to tuck in the valve extension by any suitable means, such as that described in U. S. Patent No. 1,780,720, granted November 4, 1930, to Redington. In Fig. 16 is illustrated a fragment of a bag tube 150, of the gusseted type, having its valve extension 151 tucked in to form a corner valve. The folded flap 55 may then be unfolded, see Fig. 17, to form a flexible extension of the valve 151. It is then only necessary to seam the bag ends, as at 152 and 153, see Fig. 18, to complete the bag.

From the foregoing, it is seen that the present invention provides a highly improved valve bag manufacturing apparatus, which accomplishes its intended objects, and which is well adapted to meet practical conditions of use.

While a particular embodiment of the present invention has been illustrated and described, it is not intended that said invention shall be limited to such disclosure but that changes and modifications may be made and embodied therein within the scope of the annexed claims. For example, it is appreciated that a number of webs other than the three herein described may satisfactorily be employed in the practice of the invention.

What we claim as new and desire to secure by Letters Patent, is:

1. In a bag-making machine including means for feeding a plurality of webs, and means for tubing said webs, the improvement which comprises: cutting means interposed between said feeding means and said tubing means for cutting a flap in one of said webs, fluid pressure means for turning said flap toward the adjacent portion of said one web, means for creasing said flap to fold the same against said one web, and cut-off means rearwardly of said tubing means for severing the tube in bag lengths.

2. In a bag-making machine including means for feeding a plurality of webs, and means for tubing said webs, the improvement which comprises: cutting means interposed between said feeding means and said tubing means for cutting a longitudinal flap in one of said webs, fluid pressure means for turning said flap toward the adjacent portion of said one web, means for creasing said flap to fold the same against said one web, and cut-off means rearwardly of said tubing means for severing the tube along a line spaced from said flap adjacent to the fold line thereof, whereby said flap may be unfolded to extend longitudinally beyond said severance line.

3. A bag-making machine comprising means for continuously feeding a plurality of webs, cutting means for providing longitudinally spaced flaps in one of said webs with the free ends of said flaps extending in the direction of movement of said webs, folding means for laying said flaps against said one web with the free ends extending oppositely with respect to the direction of movement of said webs, said folding means comprising means for flexing said one web to effect tangential extension of said flaps, fluid pressure means for bending said flaps longitudinally toward the adjacent portion of said one web, means for creasing said flaps to fold the latter against the adjacent portion of said one web, means for forming a tube of said webs, and cut-off means for severing said tube in bag lengths.

4. A bag-making machine comprising means for continuously feeding a plurality of webs, cutting means for providing longitudinally spaced flaps in one of said webs with the free ends of said flaps extending in the direction of movement of said webs, folding means for laying said flaps against said one web with the free ends extending oppositely with respect to the direction of movement of said webs, said folding means comprising a first roll on one side of and supporting said one web and flexing the same to effect tangential extension of said flaps, fluid pressure means for bending said flaps longitudinally toward the adjacent portion of said one web, and a second roll contiguous to said first roll on the other side of one web and cooperating with said first roll to crease said flaps and fold the latter against the adjacent portion of said one web, means for forming a tube of said webs, and cut-off means for severing said tube in bag lengths.

References Cited in the file of this patent

UNITED STATES PATENTS

| | | |
|---|---|---|
| 974,704 | Parrish | Nov. 1, 1910 |
| 1,977,647 | Royal | Oct. 23, 1934 |
| 2,010,442 | Sharkey et al. | Aug. 6, 1935 |
| 2,013,672 | Royal | Sept. 10, 1935 |
| 2,028,145 | Coty | Jan. 21, 1936 |
| 2,260,225 | Kimple | Oct. 21, 1941 |
| 2,581,801 | Lienart | Jan. 8, 1952 |